US010581691B2

(12) United States Patent
Pullo

(10) Patent No.: US 10,581,691 B2
(45) Date of Patent: *Mar. 3, 2020

(54) REDUCTION OF MANAGEMENT COMPLEXITY OF AN INFORMATION TECHNOLOGY SYSTEM

(71) Applicant: International Business Machines Corporation, Armonk, NY (US)

(72) Inventor: Raffaele Pullo, Rome (IT)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/925,941

(22) Filed: Mar. 20, 2018

(65) Prior Publication Data

US 2018/0212831 A1    Jul. 26, 2018

Related U.S. Application Data

(63) Continuation of application No. 14/842,037, filed on Sep. 1, 2015, now Pat. No. 9,979,598.

(30) Foreign Application Priority Data

Oct. 10, 2014 (GB) .................................. 1417997.2

(51) Int. Cl.
*G06F 15/173* (2006.01)
*H04L 12/24* (2006.01)

(52) U.S. Cl.
CPC ........ *H04L 41/0893* (2013.01); *H04L 41/508* (2013.01); *H04L 41/5054* (2013.01)

(58) Field of Classification Search
CPC ............. H04L 41/0893; H04L 41/5054; H04L 41/508

(Continued)

(56) References Cited

U.S. PATENT DOCUMENTS 5,440,742 A    8/1995 Schwanke
7,979,513 B2   7/2011 Garvey et al.
(Continued)

FOREIGN PATENT DOCUMENTS

EP    2189905       5/2010
WO    WO2014060226  4/2014

OTHER PUBLICATIONS

Brown et al., A Model of Configuration Complexity and its Application to a Change Management System, 0-7803-9087-3/05, 2005, IEEE, pp. 631-644.

(Continued)

*Primary Examiner* — Wing F Chan
*Assistant Examiner* — Joseph R Maniwang
(74) *Attorney, Agent, or Firm* — Schmeiser, Olsen & Watts, LLP; Mark Vallone

(57) ABSTRACT

IT assets of the IT system are grouped into asset groups by verifying characteristics and relations of the IT assets against affinity criteria in decreasing order of an affinity level of corresponding affinity criteria. A description of target platforms eligible to host the IT assets includes an indication of one or more hosting constraints and an indication of a complexity level of each target platform. At least part of the IT assets of the asset groups are mapped onto respective the target platforms by verifying the characteristics and/or relations of the IT assets of the asset groups, in decreasing order of the affinity level of the corresponding affinity criteria. The IT system is configured by hosting each mapped IT asset on the respective one or more target platform, which aggregates IT assets that have a higher affinity level on target platforms that have a lower complexity level.

20 Claims, 8 Drawing Sheets

(58) Field of Classification Search
USPC .......................................................... 709/226
See application file for complete search history.

(56) References Cited

U.S. PATENT DOCUMENTS

| | | |
|---|---|---|
| 8,352,611 B2 | 1/2013 | Maddhuri et al. |
| 8,478,879 B2 | 7/2013 | Brown et al. |
| 8,751,283 B2 | 6/2014 | Bobak et al. |
| 2009/0171740 A1 | 7/2009 | Eder |
| 2012/0166317 A1 | 6/2012 | Kamik et al. |
| 2012/0233315 A1 | 9/2012 | Hoffman et al. |
| 2012/0254879 A1 | 10/2012 | Chung et al. |
| 2013/0080480 A1 | 3/2013 | Mao et al. |
| 2014/0068071 A1 | 3/2014 | Fremont et al. |
| 2014/0164598 A1 | 6/2014 | Srinivasan |
| 2016/0105322 A1 | 4/2016 | Pullo |
| 2018/0276254 A1 | 9/2018 | Whitlock et al. |

OTHER PUBLICATIONS ip.com, System and methods to efficiently manage workload patterns in the Cloud, IP.com No. 000225221, IP.com Electronic Publication: Jan. 31, 2013, 6 pages.

Slawinski et al., Experiences with Target-Platform Heterogeneity in Clouds, Grids, and On-Premises Resources, 2012 IEEE 26th International Parallel and Distributed Processing Symposium Workshops & PhD Forum, pp. 41-52.

John Maeda, The Laws of Simplicity, Design, Technology, Business, Life, 2006 Massachusetts Institute of Technology, Includes index. ISBN 0-262-13472-1-ISBN 978-0-262-13472-9, Book.

Office Action (dated Aug. 4, 2017) for U.S. Appl. No. 14/842,037, filed Sep. 1, 2015.

Amendment (dated Nov. 3, 2017) for U.S. Appl. No. 14/842,037, filed Sep. 1, 2015.

Notice of Allowance (dated Jan. 23, 2018) for U.S. Appl. No. 14/842,037, filed Sep. 1, 2015.

REDUCTION OF MANAGEMENT COMPLEXITY OF AN INFORMATION TECHNOLOGY SYSTEM

This application is a continuation application claiming priority to Ser. No. 14/842,037, filed Sep. 1, 2015.

TECHNICAL FIELD

The present disclosure relates generally to Information Technology (IT) and more specifically to configuring an IT system.

BACKGROUND

IT systems are commonly used in a large number of applications to process data, broadly referring to any operation that may be performed in respect thereto (for example, to collet, create, store, retrieve, manipulate, transmit data). Each IT system generally comprises many IT assets of different types contributing to the IT system's operation (for example, assets of computing machines and software programs).

IT systems may become very complex. A typical example is in cloud computing (or simply cloud) environments, wherein users of a communication network are allowed to exploit computing resources on-demand as services. The (cloud) services are made available by cloud providers, which provision, configure and release the (cloud) resources upon request, so that the actual implementation of the services is completely opaque to the users that have the illusion of an infinite capacity thereof. For this purpose, the cloud providers own large IT systems with IT assets that actually implement the cloud resources with the required level of performance, reliability and security.

Different approaches may be used to measure the complexity of IT systems.

The complexity of the IT systems adversely affects management of the IT systems, for either setup or maintenance over time.

Indeed, the complexity of the IT systems makes it quite difficult for any operation thereon, which increases the starting costs and the operative costs of the IT systems. Moreover, the complexity of the IT systems reduces a quality of service of the IT systems (for example, because of the longer time that may be required to fix any malfunctioning).

The complexity of IT systems also makes it more difficult the application of any changes to the IT systems (for example, because of unpredictable side effects), which hinders (or at least substantially postpones) the adoption of new technologies and solutions. As a result, the performance of the IT systems may degrade over time. Moreover, the maintenance of the IT systems becomes more difficult when its technologies become outdated (with the risk of compromising the operation of the IT system when these technologies become completely obsolete).

SUMMARY

The present invention provides a method and associated system for configuring an IT system. A description of IT assets of the IT system is retrieved. The description of the IT assets includes an indication of characteristics of each IT asset and an indication of relations among the IT assets. The IT assets are grouped into asset groups by verifying the characteristics and the relations of the IT assets against affinity criteria in decreasing order of an affinity level of corresponding affinity criteria. Each asset group is assigned an affinity level according to the affinity level of the corresponding affinity criterion. A description of target platforms eligible to host the IT assets is retrieved. The description of the target platforms includes an indication of hosting constraints and an indication of a complexity level of each target platform. At least part of the IT assets of the asset groups is mapped onto selected one or more of the target platforms by verifying the characteristics and/or the relations of the IT assets of the asset groups, in decreasing order of the affinity level of the corresponding affinity criteria, against the hosting constraints of the target platforms, in increasing order of the complexity level of the corresponding target platforms. A proposed configuration of the IT system is generated. The proposed configuration hosts each mapped IT asset on the corresponding selected target platform.

DETAILED DESCRIPTION

The present invention is based on the idea of mapping the IT assets according to their affinity onto target platforms according to their complexity.

Particularly, the present invention provides a method for configuring an IT system, wherein IT assets are grouped into asset groups (by verifying one or more characteristics/relations of the IT assets against affinity criteria in decreasing order of an affinity level thereof), and at least part of the IT assets of the asset groups are mapped in decreasing order of an affinity level thereof onto target platforms in increasing order of a complexity level thereof.

The present invention provides a system and a computer program product for implementing methods of the present invention.

Figure 1:
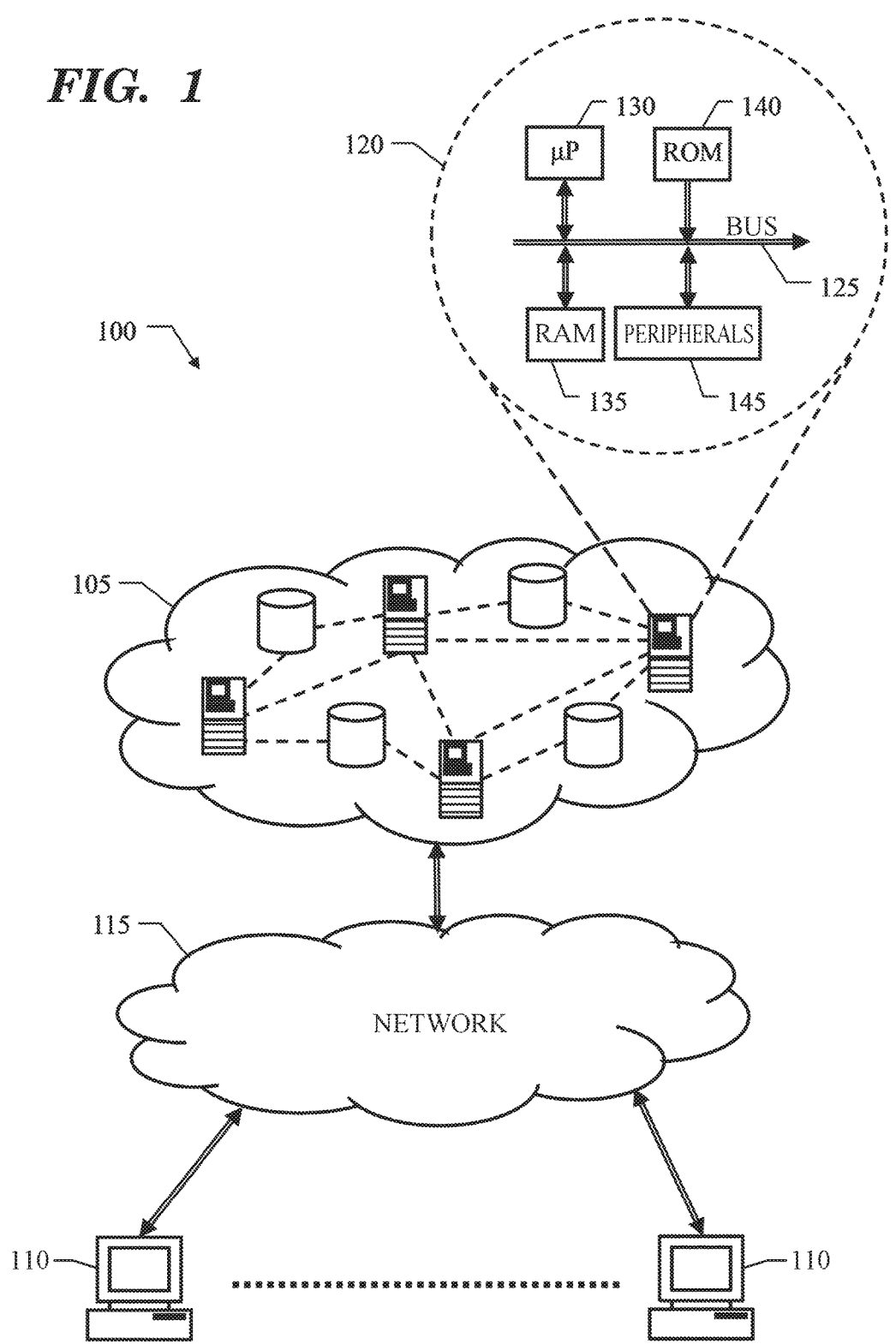
FIG. 1 depicts a schematic block diagram of an IT infrastructure, in accordance with embodiments of the present invention.

FIG. 1 depicts a schematic block diagram of an IT infrastructure 100, in accordance with embodiments of the present invention.

The IT infrastructure 100 implements a cloud (computing) environment that comprises one or more cloud providers 105 (only one cloud provider shown in the FIG. 1). Each cloud provider 105 is an entity that provides a pool of cloud resources (i.e., shared computing resources that may be provisioned, configured and released very rapidly) on-demand to users thereof. These cloud resources are generally of the virtual type (i.e., emulations by software of physical resources). Each user of the cloud provider 105 has the sole control of the corresponding cloud resources, which may then be used exactly as if the cloud resources were dedicated physical resources.

The users connect to the cloud providers 105 with corresponding computing machines 110 (for example, of the thin type) through a communication network 115. For example, the communication network 115 may be the Internet when the cloud infrastructure 100 is public (with the cloud provider 105 that is a third party billing the users on a pay-per-use basis).

The cloud provider 105 exposes a front-end component for accessing the cloud provider (for example, via a web browser) and a back-end component for actually implementing the cloud provider's cloud resources (which back-end component is not accessible from the outside, so that the users are completely agnostic about the cloud provider's location and configuration). For this purpose, the cloud provider 105 owns an IT system that comprises a pool of physical server computing machines (or simply physical servers) and storage devices organized in one or more server farms (not shown in FIG. 1).

A generic physical server, denoted with the reference 120, is formed by several units that are connected in parallel to a bus structure 125. In detail, one or more microprocessors (μP)) 130 control operation of the physical server 120; a RAM 135 is directly used as a working memory by the microprocessors 130, and a ROM 140 stores basic code for a bootstrap of the physical server 120. Moreover, the physical server 120 comprises one or more peripherals 145. The peripherals 145 comprise a mass-memory (implemented by the storage units of the server farm) and a network adapter (which is used to plug the physical server 120 in the server farm, also allowing the physical server 120 to communicate with the network 115).

Figure 2:
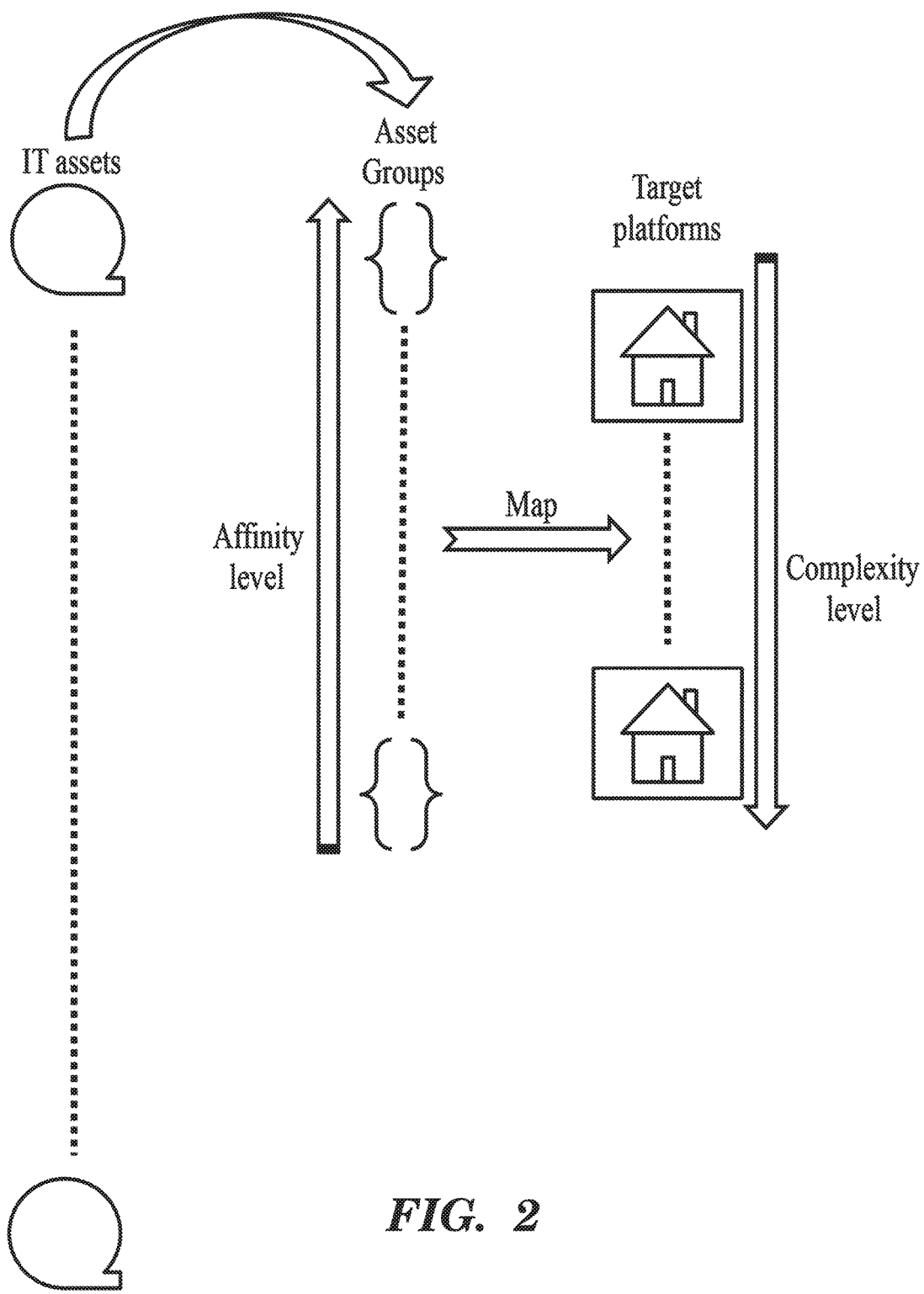
FIG. 2 depicts an exemplary application of a solution obtained in accordance with embodiments of the present disclosure invention.

FIG. 2 depicts an exemplary application of a solution obtained in accordance with embodiments of the present invention.

The IT system (of the cloud provider) comprises a plurality of IT assets. Each IT asset is a component of the IT system that is treated as a single entity in the management thereof (for example, a computing machine, a software program). The IT assets are described by one or more characteristics of each asset (for example, name and version of the software programs) and one or more relations among the assets (for example, the computing machines wherein the software programs run).

The IT assets are grouped into asset groups by verifying characteristics of the IT assets and relations against a plurality of affinity criteria (in decreasing order of an affinity level thereof). Each asset group is then assigned an affinity level according to the affinity level of the corresponding affinity criterion (for example, equal to the affinity level of an asset category defined by the corresponding affinity criterion).

Multiple target platforms are eligible to host the IT assets. Each target platform defines an environment (or layer) supporting the running of IT assets that are designed for this purpose. Each target platform is described by one or more hosting constraints (which are to be fulfilled by the IT assets for their hosting thereon, for example, the running on supported operating systems) and by a complexity level thereof (for example, defined by a corresponding platform type).

The asset groups (or at least part of the asset groups) are mapped onto one or more selected target platforms. For this purpose, the characteristics and the relations of the IT assets of the asset groups (in decreasing order of the affinity level thereof) are verified against the hosting constraints of the target platforms (in increasing order of the complexity level there).

A proposed configuration of the IT system (hosting each mapped IT asset on the corresponding selected target platform) is then generated.

In this way, the proposed configuration promotes the aggregation of IT assets that have a higher affinity level on target platforms that have a lower complexity level. Therefore, when the IT system is configured accordingly, it is possible to reduce a complexity of the IT system (since the IT assets tend to be aggregated onto target platforms with more pre-configured IT assets and management functionalities for these IT assets), which significantly simplifies the management of the IT system (for either the setup or the maintenance over time of the IT ststem).

The above-described solution allows reducing the starting costs and the operative costs of the IT system and allows increasing a quality of service of the IT system (for example, because of the shorter time that may be required to fix any malfunctioning).

The reduced complexity of the IT system also facilitates the application of changes to the IT system, which fosters the adoption of new technologies and solutions (thereby preserving the performance of the IT system and its maintenance simplicity over time).

Figure 3:
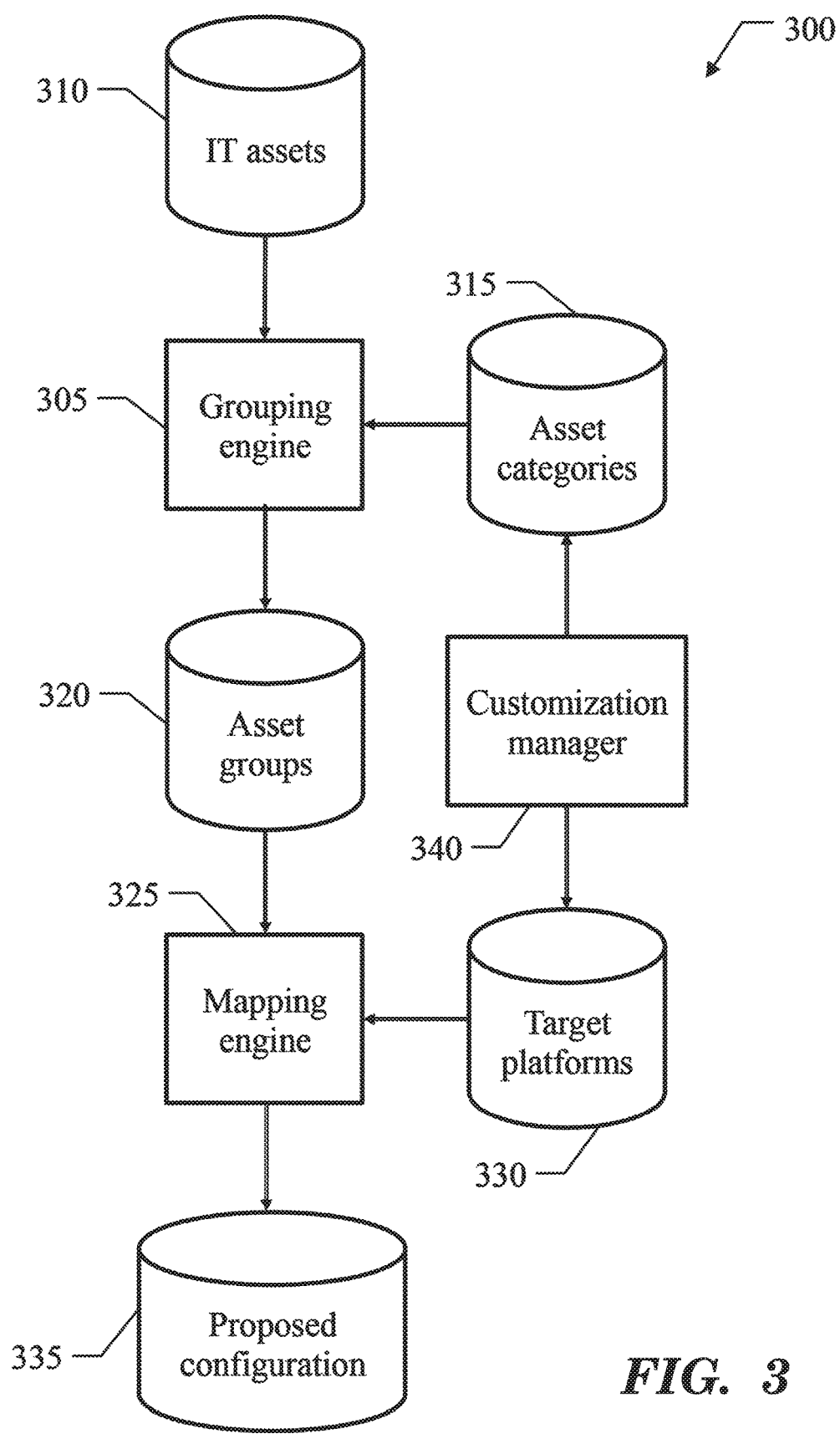
FIG. 3 depicts software components that may be used to implement embodiments of the present invention.

FIG. 3 depicts software components 300 that may be used to implement embodiments of the present invention.

The software components 300 are typically stored in the mass memory and loaded (at least partially) into the working memory of a computing machine (for example, a dedicated virtual machine running on a physical server of the cloud provider) when the programs are running. The programs are initially installed into the mass memory, for example, from removable storage units or from the communication network. In this respect, each software component may represent a module, segment or portion of code, which comprises one or more executable instructions for implementing the specified logical function.

A grouping engine 305 groups the IT assets into the asset groups. For this purpose, the grouping engine 305 accesses an asset repository 310 that stores the description (characteristics and relations) of the IT assets (for example, derived from a Configuration Management Database, or CMDB, which is commonly used as data warehouse for the IT systems of an organization), and an asset category repository 315 that stores the definition (affinity criteria and affinity levels) of the asset categories. The grouping engine 305 controls an asset group repository 320 that stores the definition (IT assets and affinity level) of the asset groups.

A mapping engine 325 maps the asset groups onto the target platforms. For this purpose, the mapping engine 325 accesses the asset group repository 320 and a target platform repository 330 that stores the definition (hosting constraints and complexity level) of the target platforms. The mapping engine 325 controls a configuration repository 335 that stores the definition (IT assets and target platforms) of each proposed configuration of the IT system.

A customization manager 340 controls the asset category repository 315 and the target platform repository 330 (for example, for allowing a system administrator to insert, update and delete information manually).

Figure 4:
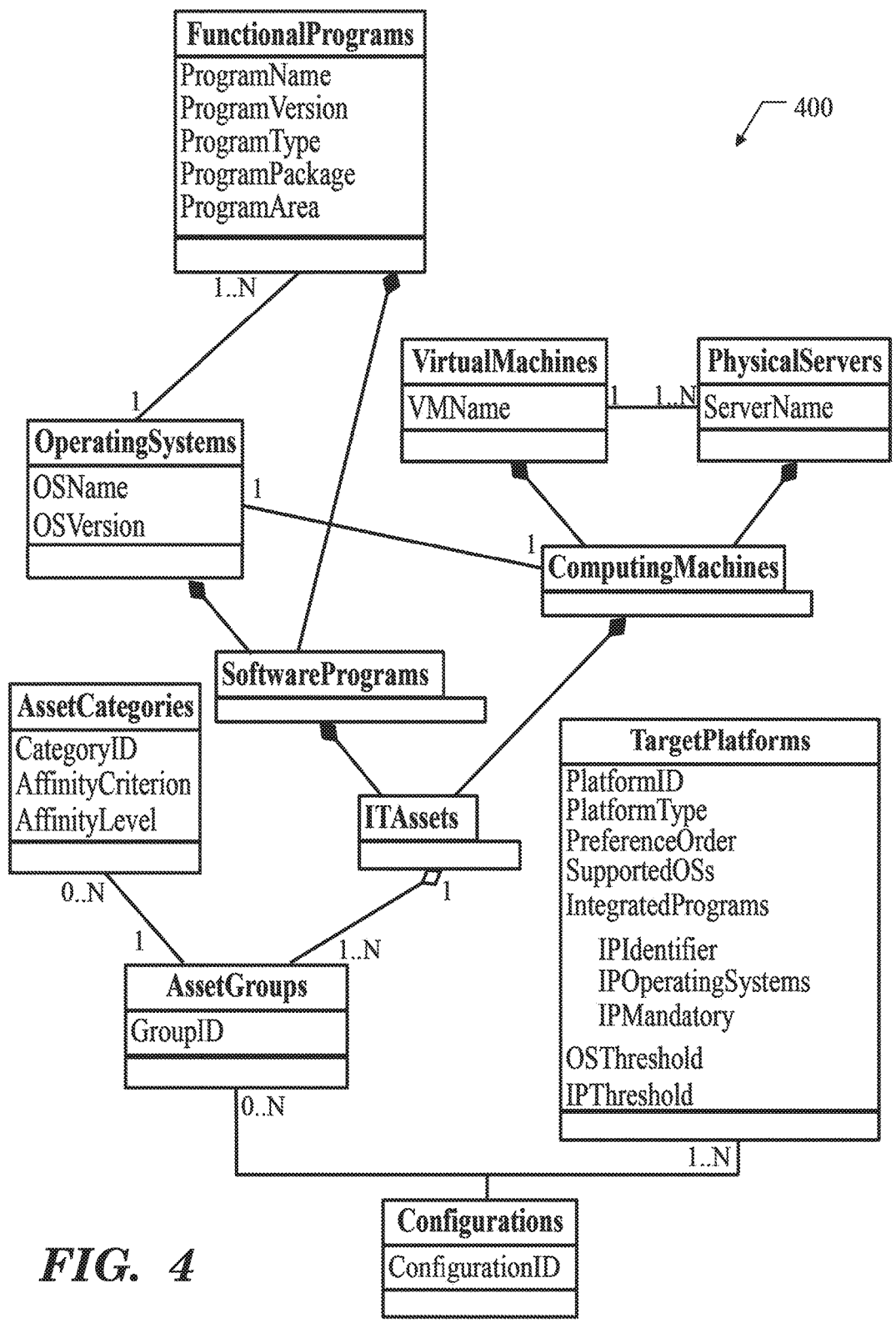
FIG. 4 depicts an exemplary model of data structures that may be used to implement embodiments of the present invention.

FIG. 4 depicts an exemplary model 400 of data structures that may be used to implement embodiments of the present invention.

The model 400 provides an abstraction of these data structures at conceptual level. Particularly, the IT assets are represented by a corresponding package (ITAssets), which is formed by a package representing the IT assets that are software programs (SoftwarePrograms) and a package representing the IT assets that are computing machines (ComputingMachines), as indicated by corresponding composition relations (with solid diamonds at the side of the software programs and the computing machines). The package SoftwarePrograms is formed by a class representing the software programs that are operating systems, directly running on the computing machines for defining software platforms on top of which any other software program may run (OperatingSystems), and by a class representing these other software programs, referred to as functional programs (FunctionalPrograms). On the other hand, the package ComputingMachines is formed by a class representing virtual (computing) machines, emulating physical computing machines by software (VirtualMachines), and a class representing physical computing machines, such as physical servers in the example at issue (PhysicalServers).

The characteristics of the IT assets are represented by attributes of the corresponding classes. The class OperatingSystems has an attribute representing its name (OSName) and an attribute representing its version (OSVersion). The class FunctionalPrograms has an attribute representing its name (ProgramName), an attribute representing its version (ProgramVersion), an attribute representing its type, as described below (ProgramType), an attribute representing its possible software package, either of the commercial or internal type (ProgramPackage) and an attribute representing its possible application area, such as sales, purchases (ProgramArea). The type of each functional program may be application program (i.e., designed to perform the functions of a specific application, such as office suite, mail client) or middleware program (i.e., interposed between the application programs and the operating systems to provide additional services, such as web server, DBMS). The class VirtualMachines has an attribute representing its name (VMName), and the class PhysicalServers has an attribute representing its name (ServerName).

Moreover, the relations among the IT assets are represented by associations among their packages/classes, as indicated by corresponding association relations (lines). Each functional program runs on an operating system (with multiple functional programs that may run on the same operating system), each operating system runs on a computing machine (virtual machine or physical server), and each virtual machine runs on a physical server multiple virtual machines that may run on the same physical server).

Multiple asset categories are predefined for grouping the IT assets. The asset categories are represented by a corresponding class (AssetCategories). The class AssetCategories has an attribute representing a unique identifier thereof (CategoryID), an attribute representing the affinity criterion (AffinityCriterion) that has to be met by the IT assets for belonging to it, and an attribute representing the corresponding affinity level (AffinityLevel). In an embodiment the affinity criteria are defined with reference to the computing machines. For example, the following affinity criteria define corresponding asset categories in decreasing order of the affinity level (such as from 5 to 1, in addition to a possible asset category for single IT assets having the affinity level equal to 0): an asset category is defined by the computing machines that run functional programs belonging to the same software package (highest affinity level 5), an asset category is defined by the computing machines that run functional programs belonging to the same application area (affinity level 4), an asset category is defined by the computing machines that run the same middleware program (affinity level 3), an asset category is defined by the computing machines that run the same operating system (affinity level 2), and an asset category is defined by the computing machines that run on the same physical server (lowest affinity level 1).

The asset groups are represented by a corresponding class (AssetGroups). The class AssetGroups has an attribute representing a unique identifier thereof (GroupID). Each asset group belongs to one of the asset categories (with multiple asset groups that may belong to the same asset category), as indicated by a corresponding association relation. Moreover, each IT asset belongs to one of the asset groups, as indicated by a corresponding aggregation relation (with an empty diamond at the side of the IT assets). For example, the asset groups may be implemented with a database that comprises a record for each functional program. The record comprises multiple fields storing the identifier of the asset group to which the functional program belongs (GroupID), the asset category of this asset group (CategoryID), the name and the version of the functional program (ProgramName and ProgramVersion, respectively), the name and the version of the operating system on which the functional program runs (OSName and OSVersion, respectively), a list of the names of the virtual machines wherein corresponding instances of the functional program may run (VMName), and a list of the names of the physical servers wherein the instances of the functional program run, either natively or through the corresponding virtual machines (ServerName).

The target platforms are represented by a corresponding class (TargetPlatforms). The class TargetPlatforms has an attribute representing a unique identifier thereof (PlatformID). In an embodiment, the class TargetPlatforms has an attribute representing a platform type (PlatformType) and an attribute representing a preference order (PreferenceOrder), which together contribute to define the complexity level. For example, the following platform types define corresponding complexity levels in increasing order of complexity (such as from 1 to 3): a platform type is defined for integrated structures with well-defined components already assembled and tuned and with dedicated management functionalities, such as virtual appliances (lowest complexity level 1), a platform type is defined for operational environments providing dedicated management functionalities for non-integrated components, such as hypervisors (complexity level 2), and a platform type is defined for standardized environments with components complying to accepted standards, such as the SOAP (highest complexity level 3). The preference order then modulates the complexity level within the same platform type, such as from 1 to 100 in decreasing preference order. Moreover, the class TargetPlatforms has an attribute representing the operating systems, with their name and version, which are supported by the target platform (SupportedOSs). The class TargetPlatforms has a (composite) attribute representing the functional programs that may be integrated in the target platform, referred to as integrated programs (IntegratedPrograms). For each integrated program, this composite attribute comprises an attribute representing the integrated program, with its name and version (IPIdentifier), an attribute representing the supported operating systems, with their name and version, on which the integrated program runs (IPOperatingSystems), and an attribute representing whether the integrated program is mandatory to take advantage of the target platform, such as when the target platform is of the special purpose type being specifically designed for the integrated program (IPMandatory). The class TargetPlatforms has an attribute representing an operating system threshold that indicates a minimum matching rate of each asset group as a whole with the supported operating systems that makes the use of the target platform advantageous, such as from 0 to 1 (OSThreshold), and an attribute representing an integrated program threshold that indicates a minimum matching rate of each asset group as a whole with the integrated programs that makes the use of the target platform advantageous, such as from 0 to 1 (IPThreshold).

The proposed configurations are represented by a corresponding class (Configurations). The class Configurations has an attribute representing a unique identifier thereof (ConfigurationID). In each proposed configuration, each IT asset may be hosted on a target platform (with multiple IT assets that may be hosted on the same target platform), as indicated by corresponding association relations.

Figure 5:
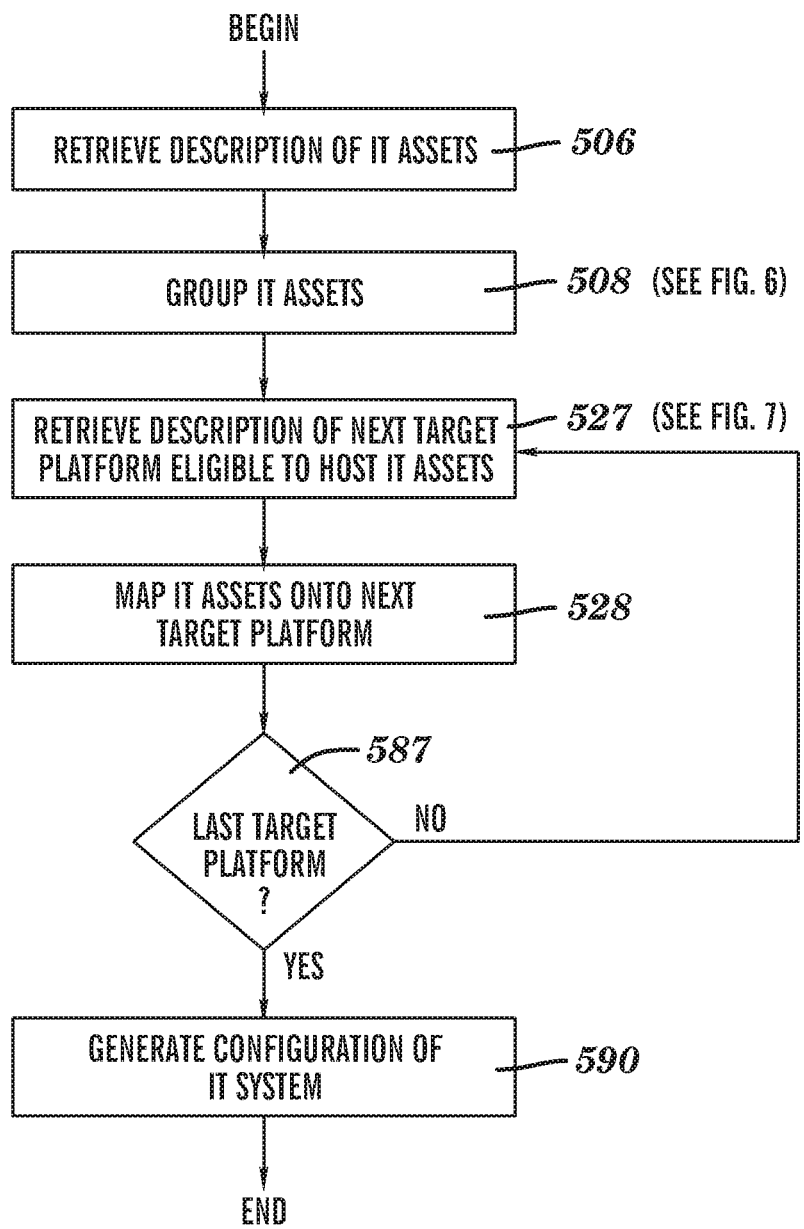
FIG. 5 is a flow chart describing a method for configuring an IT system, in accordance with embodiments of the present invention.

FIG. 5 is a flow chart describing a method for configuring an IT system, in accordance with embodiments of the present invention. Each step in FIG. 5 may represent one or more executable instructions for implementing the specified logical function on the above-mentioned server(s).

In step 506, a description of a plurality of the IT assets of the IT system are retrieved. The description of the IT assets comprise an indication of one or more characteristics of each IT asset and an indication of one or more relations among the IT assets.

In step 508, the IT assets are grouped into asset groups by verifying the characteristics and the relations of the IT assets against a plurality of affinity criteria in decreasing order of an affinity level of corresponding affinity criteria. In one embodiment, each asset group is assigned an affinity level according to the affinity level of the corresponding affinity criterion.

Figure 6:
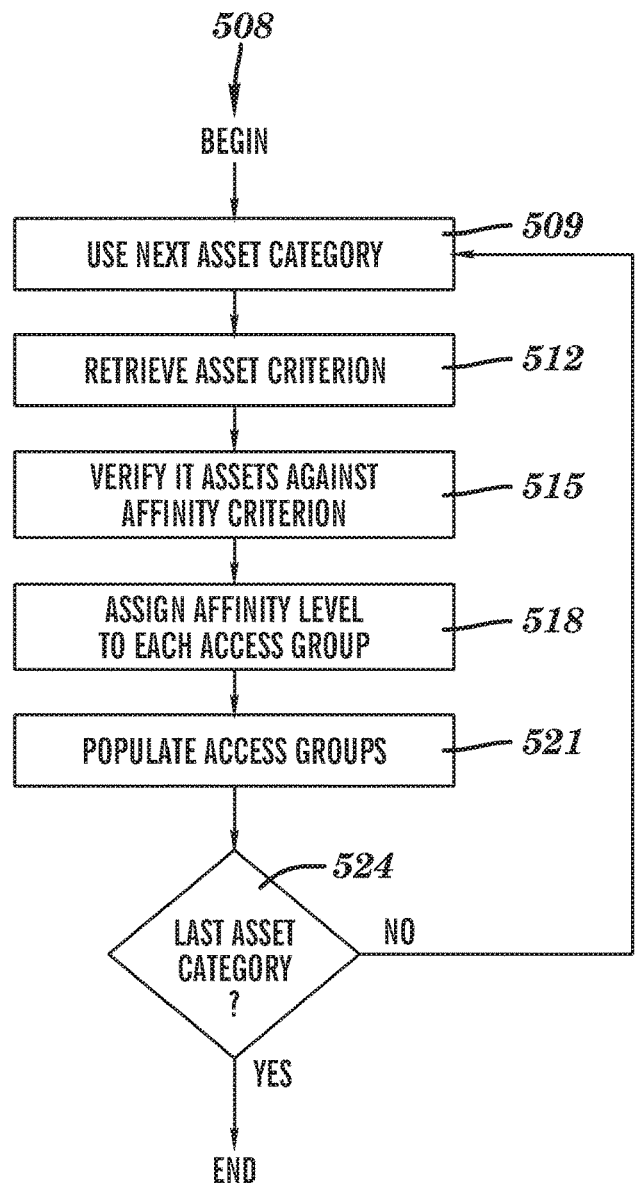
FIG. 6 is a flow chart describing, in more detail, a step in FIG. 5 of grouping IT assets, in accordance with embodiments of the present invention.

FIG. 6 is a flow chart describing, in more detail, step 508 in FIG. 5 of grouping the IT assets, in accordance with embodiments of the present invention.

In FIG. 6, a loop is performed for grouping the IT assets. The loop begins at block 509, wherein a current asset category (i.e., an initial or next asset category) is taken into account, starting the asset category with the highest affinity level. In step 512, the affinity criterion of this asset category is retrieved.

In step 515, the characteristics and relations of the IT assets that have not already been grouped (for example, as indicated by a corresponding grouping flag being asserted, with all the grouping flags that are deasserted at the beginning) are verified against the affinity criterion, in order to create corresponding asset groups. For example, with reference to the above-mentioned asset category with the highest affinity level (5), an asset group is created for each software package of the application programs.

In step 518, each access group is assigned an affinity level according to a corresponding asset category (for example, equal to the corresponding asset category).

In step 521, each access group is populated by adding the corresponding computing machines (virtual machines or physical servers), and then the software programs (operating systems and functional programs) running thereon. The grouping flag of each IT asset so grouped is asserted so as to prevent its consideration at next iterations of the loop (for asset categories with lower affinity level).

In step 524, a test is performed to verify whether a last asset category has been taken into account. If not, the process returns to the step 509 to perform the same operations with respect to a next asset category (with the immediately lower affinity level). Therefore, with reference again to the above-mentioned asset categories, in succession an asset group is created for each application area of the application programs, an asset group is created for each type of middleware program (as indicated by its name irrespectively of the version), an asset group is created for each type of operating system (as indicated by its name irrespectively of the version), and an asset group is created for each physical server.

In step 524, once all the asset categories have been taken into account, the above-described loop is exited. Returning to FIG. 5, a loop encompassing steps 527, 528 and 587 is performed for mapping the IT assets onto the target platforms. The loop begins in step 527 by taking into account a (current) target platform, starting from the target plsatform with the lowest complexity level (defined by its platform type and then by its preference order for the same platform type).

In step 527, a description of a plurality of target platforms eligible to host the IT assets is retrieved. The description of the target platforms comprise an indication of one or more hosting constraints and an indication of a complexity level of each target platform.

Step 528 maps the IT assets onto the next target platform. In one embodiment, the mapping is by verifying the characteristics and/or the relations of the IT assets of the asset groups, in decreasing order of the affinity level of the corresponding affinity criteria, against the hosting constraints of the target platforms, in increasing order of the complexity level of the corresponding target platforms.

Figure 7:
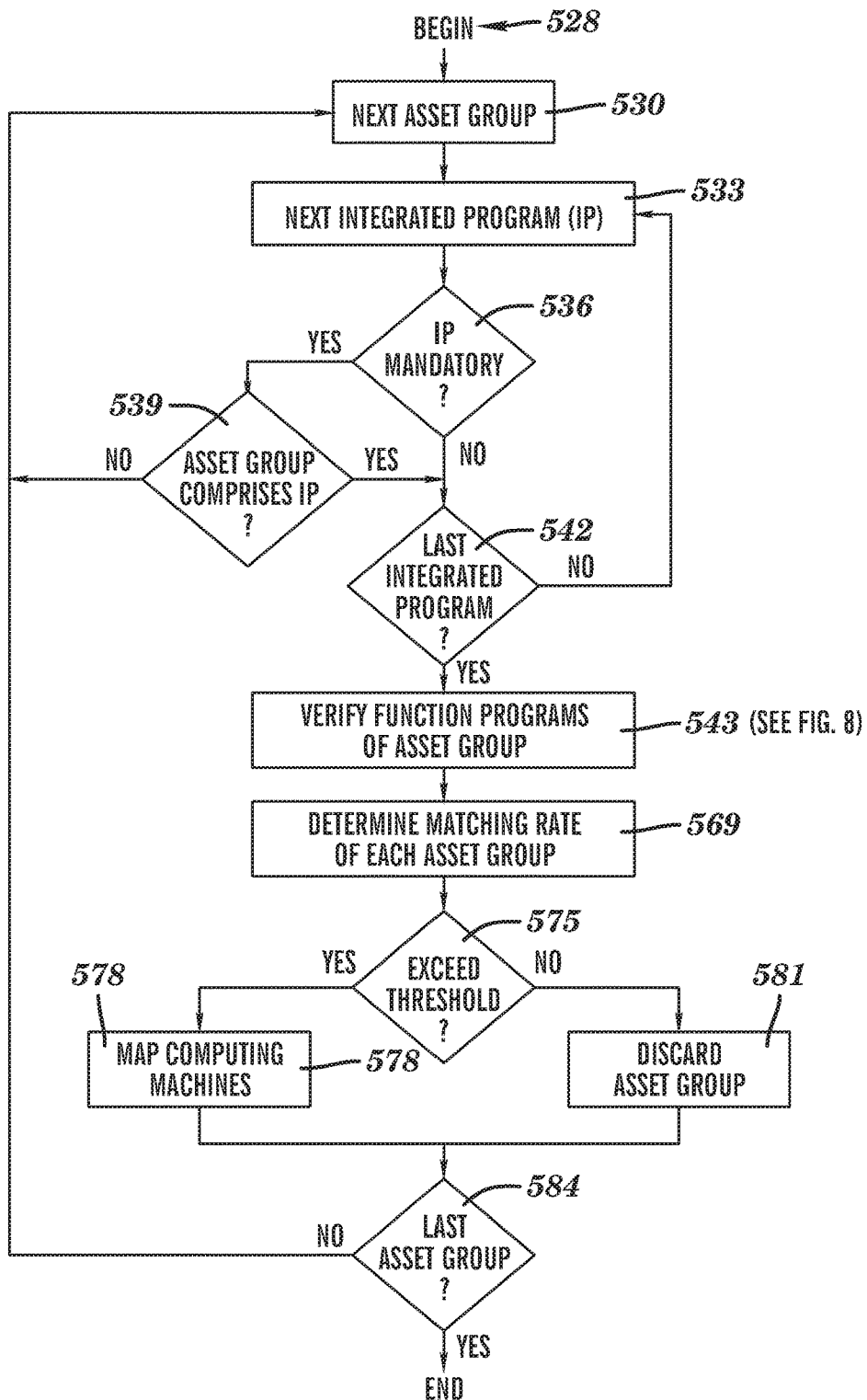
FIG. 7 is a flow chart describing, in more detail, a step in FIG. 5 of mapping the IT assets onto a next target platform, in accordance with embodiments of the present invention.

FIG. 7 is a flow chart describing, in more detail, step 528 in FIG. 5 of mapping the IT assets onto a next target platform, in accordance with embodiments of the present invention In FIG. 7 in step 530, a current (i.e., an initial or next) asset group is taken into account, starting from the first one that has been created (and then with the highest affinity level). For this purpose, the asset groups with all the computing machines that have already been mapped (for example, as indicated by a corresponding mapping flag being asserted, with all the mapping flags that are deasserted at the beginning) are skipped.

An inner loop is now performed for verifying the integrated programs of the target platform that are mandatory. The loop begins at step 533 by taking into account a (current) integrated program of the target platform (starting from the first target platform in any arbitrary order). A test is made at step 536 to verify whether the integrated program is mandatory for the target platform. If so, a further test is made at step 539 to verify whether the asset group comprises the mandatory integrated program (as identified by the mandatory integrated program's name and version). If not, the hosting of the asset group on the target platform is not advantageous, and then the asset group is discarded by returning to the step 530 to take into account a next asset group (with at least one deasserted mapping flag) that has been created immediately later on, and then with equal or lower affinity level. Conversely, if the asset group comprises the mandatory integrated program the process descends into step 542. The same point is also reached directly from the step 536 when the integrated program is not mandatory for the target platform. At step 542, a test is made to verify whether a last integrated program of the target platform has been taken into account. If not, the process returns to the step 533 to perform the same operations with respect to a next integrated program of the target platform. Conversely, once all the integrated programs of the target platform have been taken into account, the above-described inner loop is exited by descending into step 543.

Step 543 verifies functional programs of the asset group.

Figure 8:
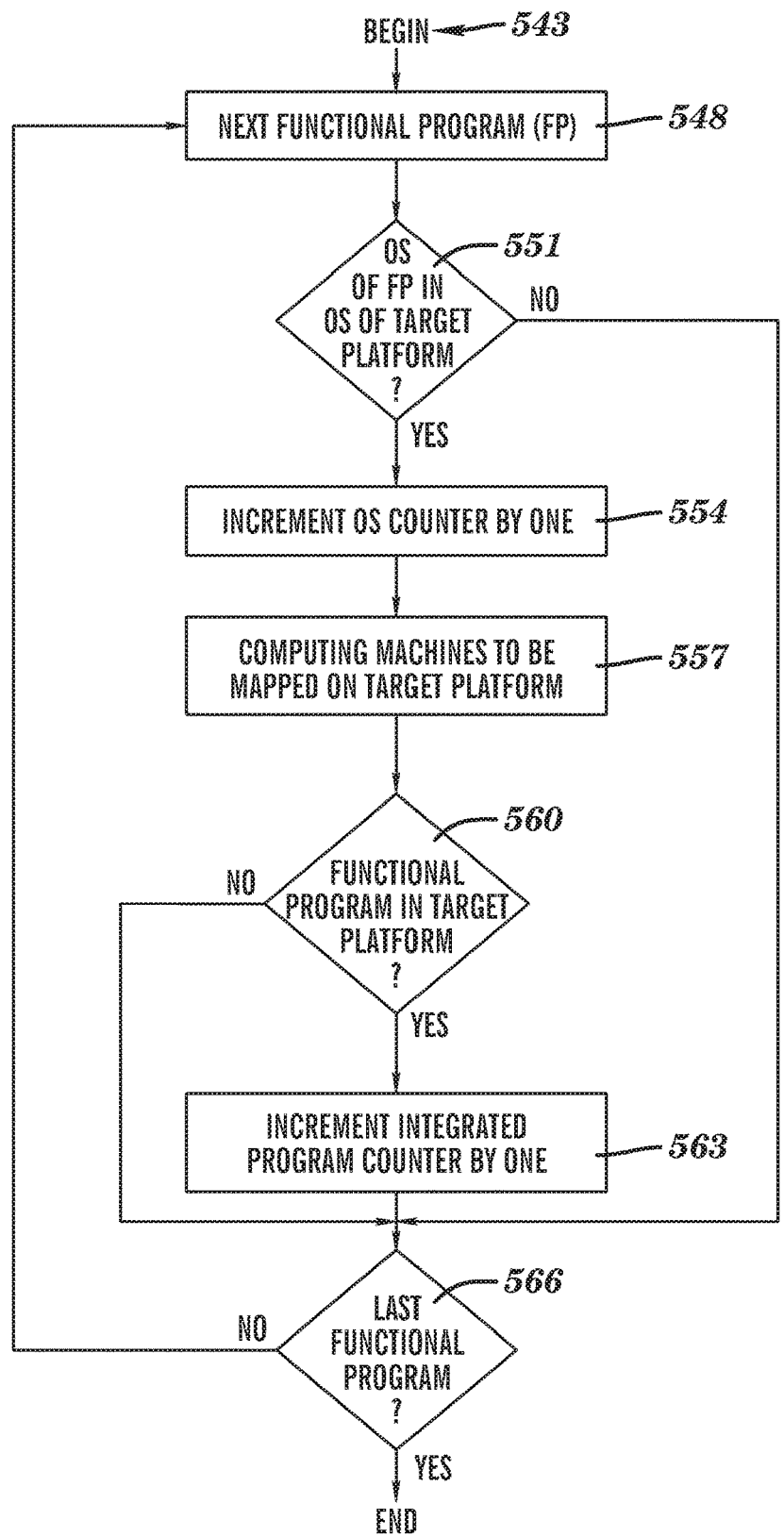
FIG. 8 is a flow chart describing, in more detail, a step in FIG. 7 of verifying functional programs of an asset group, in accordance with embodiments of the present invention.

FIG. 8 is a flow chart describing, in more detail, step 543 in FIG. 7 of verifying functional programs of the asset group, in accordance with embodiments of the present invention.

In FIG. 8, an operating system counter and an integrated program counter (for counting the supported operating systems and the integrated programs, respectively, of the target platform that are comprised in the asset group) are initialized to zero. Another loop is now performed for verifying the functional programs of the asset group. The loop begins at step 548 by taking into account a (current) functional program of the asset group (starting from the first asset group in any arbitrary order). A test is made at step 551 to verify whether the operating system of the functional program is comprised in the supported operating systems of the target platform. If so (meaning that the running of the functional program on the target platform is possible), the operating system counter is incremented by one at step 554.

In step 557, each computing machine (wherein the operating system of the functional program runs) identified as potentially adapted to be mapped on the target platform (for example, by asserting a corresponding potential flag, with all the potential flags that are deasserted at the beginning).

In step 560, a further test is performed to verify whether the functional program is comprised in the integrated programs of the target platform. If so, the integrated program counter is incremented by one at step 563. The process then descends into step 566. The same point (step 566) is also reached directly from the step 560 when the functional program is not comprised in the integrated programs of the target platform (so as to leave the integrated program counter unchanged) or from the step 551 when the operating system of the functional program is not comprised in the supported operating systems of the target platform (so as to skip the functional program since its running on the target platform is not possible).

In step 566, a test is made to verify whether a last functional program of the asset group has been taken into account. If not, the process returns to the step 548 to perform the same operations with respect to a next functional program of the asset group. Conversely, once all the functional programs of the asset group have been taken into account the above-described inner loop is exited.

Returning to FIG. 7 at step 569, an operating system matching rate (indicating a matching of the asset group as a whole with the supported operating systems of the target platform) is calculated by dividing the operating system counter by a total number of the functional programs of the asset group. Likewise, an integrated program matching rate (indicating a matching of the asset group as a whole with the integrated programs of the target platform) is calculated by dividing the integrated program counter by the same total number of the functional programs of the asset group. The operating system matching rate and the integrated program matching rate are compared at step 575 with the operating system threshold and with the integrated program threshold, respectively. The flow of activity branches at step 575 according to a result of this comparison. If both the operating system matching rate and the integrated program matching rate are (possibly strictly) higher than the operating system threshold and integrated program threshold, respectively, at step 578 the computing machines previously identified as potentially adapted to be mapped on the target platform (corresponding potential flags asserted are ac ally mapped thereon (by populating the configuration repository accordingly). At the same time, the mapping flags of these computing machines are asserted so as to prevent consideration of the mapping flags at next iterations of the loop (for target platforms with equal or higher complexity level). Conversely, if the operating system matching rate is (possibly strictly) lower than the operating system threshold and/or the integrated program matching rate is (possibly strictly) lower than the integrated program threshold, the hosting of the asset group on the target platform is not advantageous, and then the asset group is discarded at step 581 by deasserting the potential flags of all its computing machines.

The flow of activity merges again at step 584 from either the step 578 or the step 581. In step 584, a test is made to verify whether a last asset group has been taken into account. If not, the process returns to the step 530 to perform the same operations with respect to a next asset group (with at least one deasserted mapping flag) that has been created immediately later on, and then with equal or lower affinity level. Conversely, once all the asset groups have been taken into account the above-described inner loop is exited.

Returning to FIG. 5, a further test is made in step 587 to verify whether a last target platform has been taken into account. If not, the process returns to the step 527 to perform the same operations with respect to a next target platform (with equal or higher complexity level). Conversely, once all the target platforms have been taken into account the above-described loop is exited and step 590 is executed next.

In step 590, generation of the proposed configuration of the IT system (with the computing machines mapped on the target platforms as a result of the above-described operations) is completed. The proposed configuration hosts each mapped IT asset on the corresponding selected target platform. For this purpose, any possible computing machine that has not been mapped (as indicated by the corresponding mapping flag that is deasserted) is added to the proposed configuration without any modification. The proposed configuration may then be used either to create a new implementation of the IT system or to transform a current implementation thereof (generally after a human review taking into account other factors, such as budget constraints, resource availability). For this purpose, in case of transformation of the implementation of the IT system (according to the proposed configuration), it is also possible to calculate (with any known method) the complexity of the transformed implementation of the IT system and compare the complexity of the transformed implementation of the IT system with the complexity of the current implementation of the IT system (so as to determine the resulting improvement that may be used as a further factor for deciding the application of the proposed configuration). The process then ends.

In order to satisfy local and specific requirements, a person skilled in the art pray apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise and the term means for (or any means-plus-function formulation) should be intended as any entity or structure adapted or configured for carrying out the relevant function.

For example, an embodiment provides a method for configuring an IT system. The method comprises the following steps. A description is retrieved of a plurality of IT assets of the IT system; the description of the IT assets comprises an indication of one or more characteristics of each IT asset and an indication of one or more relations among the IT assets. The IT assets are grouped into asset groups by verifying the characteristics and the relations of the IT assets against a plurality of affinity criteria in decreasing order of an affinity level thereof; each asset group is assigned an affinity level according to the affinity level of the corresponding affinity criterion. A description is retrieved of a plurality of target platforms eligible to host the IT assets; the description of the target platforms comprises an indication of one or more hosting constraints and an indication of a complexity level of each target platform. At least part of the IT assets of the asset groups are mapped onto selected one or more of the target platforms by verifying the characteristics and/or the relations of the IT assets of the asset groups (in decreasing order of the affinity level thereof) against the hosting constraints of the target platforms increasing order of the complexity level thereof). A proposed configuration of the IT system is generated; the proposed configuration hosts each mapped IT asset on the corresponding selected target platform.

However, the IT system ay be of any type (for example, a traditional data center). The IT system may comprise any IT assets (see below), which may be described by any number and type of characteristics (for example, service level agreement, computing power, memory size) and by any number and type of relations (for example, user/service, client/server). The IT assets may be grouped in any way (see below). The target platforms may be in any number and of any type (for example, workstations, hypervisors), and they may be described in any way (see below). The asset groups may be mapped on the target platforms in any way (see below). The proposed configuration may be generated in any way (for example, accepting it only when all the IT assets have been mapped onto the target platforms).

In an embodiment, the IT assets comprise one or more software programs and one or more computing machines running the software programs, the software programs comprise one or more operating systems and one or more functional programs running on the operating systems, the functional programs may be application programs and/or middleware programs interposed between the application programs and the operating systems, and the computing machines may be physical machines and/or virtual machines running on the physical machines. However, the IT assets may be in any number and of different, additional or alternative type (for example, services, network connections, routers)

In an embodiment, said step of grouping the IT assets comprises assigning each asset group the affinity level of an asset category defined by a corresponding affinity criterion.

However, the affinity level of each asset group may be determined in any other way (for example, by applying an adjusting factor to the affinity level of the corresponding affinity criterion depending on specific characteristics/relations of the IT assets of the asset group, such as their number).

In an embodiment, said step of grouping the IT assets comprises creating an asset group for each set of one or more computing machines whose characteristics and/or relations fulfill one of the affinity criteria, and populating each asset group by adding the corresponding computing machines and the software programs running thereon.

However, the IT assets may be grouped in any other way (for example, by verifying the affinity criteria against the characteristics/relations of the software programs, in addition or in alternative to the ones of the computing machines, for example, based on the departments of corresponding users).

In an embodiment, said step of grouping the IT assets comprises verifying in succession an affinity criterion defined by the computing machines running one or more functional programs belonging to a same software package, an affinity criterion defined by the computing machines running one or more functional programs belonging to a same application area, an affinity criterion defined by the computing machines running a same middleware program, an affinity criterion defined by computing machines running a same operating system, and/or an affinity criterion defined by the virtual machines running on a same physical machine.

However, the affinity criteria may be in any number and of different, additional or alternative type (for example, defined by virtual machines running on a same hypervisor, by physical machines arranged at a same location).

In an embodiment, said step of retrieving a description of a plurality of target platforms comprises retrieving an indication of a platform type of each target platform and an indication of a preference order of the target platform within the platform type, the complexity level of the target platform depending on the corresponding platform type and preference order. However, the platform type may be of any kind (see below) and the preference order may be defined in any way (for example, simply by a low/high value). In any case, the complexity level of the target platforms may be defined in any other way (for example, individually for each target platform by actually calculating it with any known method according to characteristics thereof).

In an embodiment, the platform type is selected among a plurality of predefined platform types comprising, in increasing order of contribution to the complexity level, a platform type defining an integrated structure, a platform type defining an operational environment and/or a platform type defining a standardized environment.

However, the platform types may be in any number and of different, additional or alternative type (for example, defining a custom environment).

In an embodiment, said step of mapping at least part of the IT assets of the asset groups comprises mapping each computing machine whose characteristics and/or relations fulfill the hosting constrains of a target platform thereon.

However, the mapping may be applied to any IT asset (for example, to the software programs, in addition or in alternative to the computing machines), either individually or at the level of entire asset groups only.

In an embodiment, the hosting constrains of each target platform comprises an indication of one or more supported operating systems. Said step of mapping at least part of the IT assets of the asset groups comprises verifying whether the operating system of each functional program is comprised in the supported operating systems of each target platform, and mapping each computing machine (whereon the operating system of each functional program comprised in the corresponding supported operating systems runs) on the target platform.

However, the hosting constrains may be in any number and of different, additional or alternative type (for example, based on the hardware architecture of the physical machines).

In an embodiment, the hosting constrains of at least one of the target platforms comprises at least one matching threshold for one or more advantageous software programs being advantageous in the target platform. Said step of mapping at least part of the IT assets of the asset groups comprises determining a matching rate of each asset group with the advantageous software programs of each matching threshold according to the software programs of the asset group comprised in the advantageous software programs, and comparing each matching rate with the corresponding matching threshold.

However, any number of matching thresholds may be comprised in any number of hosting constraints (down to none), each one for any number and type of advantageous software programs (see below). Each matching rate may be determined in any way (for example, by weighting the contribution of different software programs), and it may be compared with the corresponding matching threshold in any way (either individually or as a whole, for example, by compensating shortages with excesses for different matching thresholds).

In an embodiment, said at least one matching threshold comprises an operating system matching threshold for supported operating systems of the target platform. Said step of mapping at least part of the IT assets of the asset groups comprises determining an operating system matching rate of each asset group with respect to each target platform according to the operating systems, on which the functional programs of the asset group run, comprised in the supported operating systems of the target platform, and comparing each operating system matching rate with the corresponding operating system matching threshold.

However, the supported operating systems may be in any number and of any type (for example, just enough operating Systems, jeOS).

In an embodiment, said at least one matching threshold comprises an integrated program matching threshold for integrated programs of the target platform. Said step of mapping at least part of the IT assets of the asset groups comprises determining an integrated program matching rate of each asset group with respect to each target platform according to the functional programs of the asset group comprised in the integrated programs of the target platform, and comparing each integrated program matching rate with the corresponding integrated program matching threshold.

However, the integrated programs may be in any number and of any type (for example, utilities).

In any case, different, additional or alternative types of advantageous programs (providing any advantage in the target platform) may be taken into account (for example, the supported operating systems only, the integrated programs only, both of them, functional programs optimized for the corresponding operating systems).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A computer program product of the present invention comprises a computer readable hardware storage medium/device having computer readable program code stored therein, said program code containing instructions which, upon being executed by a processor of a computer system, implement the methods of the present invention.

A computer system of the present invention comprises a processor, a memory coupled to the processor, and a computer readable storage device coupled to the processor, said storage device containing program code which, upon being executed by the processor via the memory, implements the methods of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for configuring an Information Technology (IT) system in a manner that decreases a complexity of the IT system, said method comprising:
   grouping, by a processor of a computer system, IT assets of the IT system into asset groups by verifying one or more characteristics and one or more relations of the IT assets against a plurality of affinity criteria in decreasing order of an affinity level of corresponding affinity criteria, each asset group being assigned an affinity level according to the affinity level of the corresponding affinity criterion;
   retrieving, by the processor, a description of a plurality of target platforms eligible to host the IT assets, said description of the target platforms comprising an indication of one or more hosting constraints and an indication of a complexity level of each target platform;
   mapping, by the processor, at least part of the IT assets of the asset groups onto respective one or more of the target platforms by verifying the one or more characteristics and/or the one or more relations of the IT assets of the asset groups, in decreasing order of the affinity level of the corresponding affinity criteria, against the hosting constraints of the target platforms, in increasing order of the complexity level of the corresponding target platforms; and
   configuring, by the processor, the IT system, said configuring the IT system comprising hosting each mapped IT asset on the respective one or more target platform, which aggregates IT assets that have a higher affinity level on target platforms that have a lower complexity level so as to decrease the complexity of the IT system.

2. The method of claim 1, said method further comprising:
   prior to said grouping, retrieving, by the processor, a description of the IT assets, said description of the IT assets comprising an indication of the one or more characteristics of each IT asset and an indication of the one or more relations among the IT assets.

3. The method of claim 1, wherein said grouping the IT assets comprises:
assigning each asset group the affinity level of an asset category defined by a corresponding affinity criterion.

4. The method of claim 1, wherein the IT assets comprise one or more software programs and one or more computing machines running the software programs, wherein the software programs comprise one or more operating systems and one or more functional programs running on the operating systems, wherein the functional programs are application programs and/or middleware programs interposed between the application programs and the operating systems, and wherein the computing machines are physical machines and/or virtual machines running on the physical machines.

5. The method of claim 4, wherein said grouping the IT assets comprises:
creating an asset group for each set of the one or more computing machines whose characteristics and/or relations fulfill one of the affinity criteria, and
populating each asset group by adding the corresponding computing machines and the software programs running thereon.

6. The method of claim 5, wherein said grouping the IT assets comprises:
verifying in succession an affinity criterion defined by the computing machines running one or more functional programs belonging to a same software package, an affinity criterion defined by the computing machines running one or more functional programs belonging to a same application area, an affinity criterion defined by the computing machines running a same middleware program, an affinity criterion defined by computing machines running a same operating system and/or an affinity criterion defined by the virtual machines running on a same physical machine.

7. The method of claim 4, wherein said retrieving a description of a plurality of target platforms comprises:
retrieving an indication of a platform type of each target platform and an indication of a preference order of the target platform within the platform type, the complexity level of the target platform depending on the corresponding platform type and preference order.

8. The method of claim 7, wherein the platform type is selected from the group consisting of a plurality of pre-defined platform types comprising, in increasing order of contribution to the complexity level, a platform type defining an integrated structure, a platform type defining an operational environment, and/or a platform type defining a standardized environment.

9. The method of claim 8, wherein said mapping at least part of the IT assets of the asset groups comprises:
mapping each computing machine whose characteristics and/or relations fulfill the hosting constraints of a target platform thereon.

10. The method of claim 9, wherein the hosting constraints of each target platform comprises an indication of one or more supported operating systems, said mapping at least part of the IT assets of the asset groups comprises:
verifying whether the operating system of each functional program is comprised in the supported operating systems of each target platform, and
mapping each computing machine, whereon the operating system of each functional program comprised in the corresponding supported operating systems runs, onto the target platform.

11. The method of claim 4, wherein the hosting constraints of at least one of the target platforms comprises at least one matching threshold for one or more software programs being advantageous in the target platform, said mapping at least part of the IT assets of the asset groups comprises:
determining a matching rate of each asset group with the advantageous software programs of each matching threshold according to the software programs of the asset group comprised in the advantageous software programs, and
comparing each matching rate with the corresponding matching threshold.

12. The method of claim 11, wherein said at least one matching threshold comprises an operating system matching threshold for supported operating systems of the target platform, said mapping at least part of the IT assets of the asset groups comprises:
determining an operating system matching rate of each asset group with respect to each target platform according to the operating systems, on which the functional programs of the asset group run, comprised in the supported operating systems of the target platform, and
comparing each operating system matching rate with the corresponding operating system matching threshold.

13. The method of claim 11, wherein said at least one matching threshold comprises an integrated program matching threshold for integrated programs of the target platform, said mapping at least part of the IT assets of the asset groups comprises:
determining an integrated program matching rate of each asset group with respect to each target platform according to the functional programs of the asset group comprised in the integrated programs of the target platform, and
comparing each integrated program matching rate with the corresponding integrated program matching threshold.

14. A computer program product, comprising:
a computer readable hardware storage device having computer readable program code stored therein, said program code containing instructions which, upon being executed by a processor of a computer system, implement a method for configuring an Information Technology (IT) system in a manner that decreases a complexity of the IT system, said method comprising:
grouping, by the processor, IT assets of the IT system into asset groups by verifying one or more characteristics and one or more relations of the IT assets against a plurality of affinity criteria in decreasing order of an affinity level of corresponding affinity criteria, each asset group being assigned an affinity level according to the affinity level of the corresponding affinity criterion;
retrieving, by the processor, a description of a plurality of target platforms eligible to host the IT assets, said description of the target platforms comprising an indication of one or more hosting constraints and an indication of a complexity level of each target platform;
mapping, by the processor, at least part of the IT assets of the asset groups onto respective one or more of the target platforms by verifying the one or more characteristics and/or the one or more relations of the IT assets of the asset groups, in decreasing order of the affinity level of the corresponding affinity criteria, against the hosting constraints of the target platforms, in increasing order of the complexity level of the corresponding target platforms; and configuring, by the processor, the IT system, said configuring the IT system comprising hosting each mapped IT asset on the respective one or more target platform, which aggregates IT assets that have a higher affinity level on target platforms that have a lower complexity level so as to decrease the complexity of the IT system.

15. The computer program product of claim 14, said method further comprising:
   prior to said grouping, retrieving, by the processor, a description of the IT assets, said description of the IT assets comprising an indication of the one or more characteristics of each IT asset and an indication of the one or more relations among the IT assets.

16. The computer program product of claim 14, wherein the IT assets comprise one or more software programs and one or more computing machines running the software programs, wherein the software programs comprise one or more operating systems and one or more functional programs running on the operating systems, wherein the functional programs are application programs and/or middleware programs interposed between the application programs and the operating systems, and wherein the computing machines are physical machines and/or virtual machines running on the physical machines.

17. The computer program product of claim 16, wherein said grouping the IT assets comprises:
   creating an asset group for each set of the one or more computing machines whose characteristics and/or relations fulfill one of the affinity criteria, and
   populating each asset group by adding the corresponding computing machines and the software programs running thereon.

18. A computer system, comprising:
   a processor, a memory coupled to the processor, and a computer readable storage device coupled to the processor, said storage device containing program code which, upon being executed by the processor via the memory, implements a method for configuring an Information Technology (IT) system in a manner that decreases a complexity of the IT system, said method comprising:
   grouping, by the processor, IT assets of the IT system into asset groups by verifying one or more characteristics and one or more relations of the IT assets against a plurality of affinity criteria in decreasing order of an affinity level of corresponding affinity criteria, each asset group being assigned an affinity level according to the affinity level of the corresponding affinity criterion;
   retrieving, by the processor, a description of a plurality of target platforms eligible to host the IT assets, said description of the target platforms comprising an indication of one or more hosting constraints and an indication of a complexity level of each target platform;
   mapping, by the processor, at least part of the IT assets of the asset groups onto respective one or more of the target platforms by verifying the one or more characteristics and/or the one or more relations of the IT assets of the asset groups, in decreasing order of the affinity level of the corresponding affinity criteria, against the hosting constraints of the target platforms, in increasing order of the complexity level of the corresponding target platforms; and
   configuring, by the processor, the IT system, said configuring the IT system comprising hosting each mapped IT asset on the respective one or more target platform, which aggregates IT assets that have a higher affinity level on target platforms that have a lower complexity level so as to decrease the complexity of the IT system.

19. The computer system of claim 18, wherein the IT assets comprise one or more software programs and one or more computing machines running the software programs, wherein the software programs comprise one or more operating systems and one or more functional programs running on the operating systems, wherein the functional programs are application programs and/or middleware programs interposed between the application programs and the operating systems, and wherein the computing machines are physical machines and/or virtual machines running on the physical machines.

20. The computer system of claim 19, wherein said grouping the IT assets comprises:
   creating an asset group for each set of the one or more computing machines whose characteristics and/or relations fulfill one of the affinity criteria, and
   populating each asset group by adding the corresponding computing machines and the software programs running thereon.

* * * * *